US005959939A

United States Patent [19]

Tengham et al.

[11] Patent Number: 5,959,939

[45] Date of Patent: Sep. 28, 1999

[54] ELECTRODYNAMIC DRIVING MEANS FOR ACOUSTIC EMITTERS

[75] Inventors: Rune Tengham; Magnus Zetterlund, both of Västerås, Sweden

[73] Assignee: Unaco Systems AB, Vasteras, Sweden

[21] Appl. No.: 08/974,000

[22] PCT Filed: May 28, 1996

[86] PCT No.: PCT/NO96/00131

§ 371 Date: Dec. 12, 1997

§ 102(e) Date: Dec. 12, 1997

[87] PCT Pub. No.: WO97/01770

PCT Pub. Date: Jan. 16, 1997

[30] Foreign Application Priority Data

Jun. 28, 1995 [NO] Norway ..................................... 952605

[51] Int. Cl.[6] ............................ H04R 1/44; G01V 1/145; G10K 9/13

[52] U.S. Cl. ............................................................ 367/174

[58] Field of Search .................................... 367/163, 174; 181/110; 310/337; 381/190

[56] References Cited

U.S. PATENT DOCUMENTS

| | | | |
|---|---|---|---|
| 1,097,859 | 5/1914 | Hecht . | |
| 1,155,124 | 9/1915 | Berger . | |
| 2,832,952 | 4/1958 | Bagno . | |
| 4,384,351 | 5/1983 | Pagliarini, Jr. et al. . | |
| 5,126,979 | 6/1992 | Rowe, Jr. et al. . | |
| 5,329,499 | 7/1994 | Molund et al. | 367/174 |
| 5,375,101 | 12/1994 | Wolfe et al. . | |
| 5,457,752 | 10/1995 | Engdahl et al. | 381/190 |
| 5,646,380 | 7/1997 | Vaage | 367/142 |
| 5,757,726 | 5/1998 | Tenghamn | 367/163 |
| 5,757,728 | 5/1998 | Tenghamn et al. | 367/163 |

FOREIGN PATENT DOCUMENTS

| | | |
|---|---|---|
| 4028913 | 3/1992 | Germany . |
| 176457 | 12/1994 | Norway . |
| 2263842 | 4/1993 | United Kingdom . |
| 2263842 | 8/1993 | United Kingdom . |
| 9422036 | 9/1994 | WIPO . |
| PCT/NO95/00071 | 5/1995 | WIPO . |

OTHER PUBLICATIONS

F. S. Kramer et al., "Seismic Energy Sources 1968 Handbook," The 38$^{th}$ Annual Meeting of the SEG, Oct., 1968.

R. W. Timms, et al, "Transducer needs for low–frequency sonar," Proceedings of Meeting, Jun., 1990.

Guido Baeten, et al., "The marine vibrator source," First Break, Sep., 1988, vol. 6, No. 9.

*Primary Examiner*—Daniel T. Pihulic
*Attorney, Agent, or Firm*—Gordon T. Arnold

[57] ABSTRACT

Drive assembly for acoustic sources with vibrating surfaces (1) capable of being set in vibrational motion, especially for use in seismic studies, comprising a frame (4) comprising at least one preferably centrally positioned drive part (3, 13). The drive assembly also comprises: two or more fastening devices (2) mounted in relation to the sound emitting surfaces (1) and positioned on opposite sides of the frame (4); two or more flexible transmission elements (5) connecting the fastening devices (2) to each other and extending on both sides of the axis between the two fastening devices;5 two or more second drive parts (6, 7, 16, 17) connected to the transmission elements (5) and positioned in cooperation with said first drive parts (3, 13) in order to make electromagnetic drives; and that each of the electromagnetic drives are adapted to provide a controlled oscillating relative motion between the related drive parts (3, 6, 7, 16, 17).

23 Claims, 5 Drawing Sheets

ELECTRODYNAMIC DRIVING MEANS FOR ACOUSTIC EMITTERS

This invention relates to a drive assembly for acoustic sources having sound emitting surfaces adapted to be excited into vibrational motion, in particular for use in seismic prospecting.

TECHNICAL FIELD

Sources employed for generating sound waves in water can for example be sonar sources, flextensional sources or seismic transmitters or energy sources. Advantageously the invention can be employed for such types of sources, i.e. for emitting sound waves under water. Upon reflection from the sea bed and underlying geological formations, resulting echo signals can be detected by means of hydrophones or geo phones of various types.

It is well known that low frequency sound waves can be transmitted over longer distances through water and geological structures than high frequency sound waves can. Within military applications as well as within the marine sector of oil and gas industry there has for a long time been a need for powerful low frequency sound sources which can operate under water. Sources of various constructions and designs for these purposes and fields of use, have been available for a long time. Such acoustic sources are for example described in Seismic Energy Sources 1968 Handbook, Bendix, United Geophysical Corporation 1968, and in Transducer Needs for Low-Frequency Sonar, Proceedings of the Second International Workshop on Power Transducers for Sonic and Ultrasonics, France, Jun. 12–13, 1990.

Most of the acoustic sources employed today are of the impulsive type, in which efforts are made to have the sources emit as much energy as possible during as short a time as possible. The frequency contents of such a source can be modified only to a very small degree, and different sources are selected for different surveying problems.

In recent time there have been developed seismic energy sources in the form of vibrators which can vibrate within various frequency bands, so-called “frequency sweep”. To this group belong vibrators which operate by employing hydraulic means and sources employing piezoelectric or magnetostrictive materials. In hydraulic vibrators a piston is controlled by a valve arrangement, and thereby it is possible to obtain high oscillation amplitudes. The piezoelectrical effect as known involves a change of length of a crystalline material when an electrical voltage is applied to its outer surfaces, and conversely that an electrical voltage is generated when the material is subjected to a physical deformation. Magnetostriction means that a magnetic material being subjected to a magnetic field change will undergo a length change, and conversely that an applied length change of the material will give rise to a change of the magnetic field.

There are various manners of designing acoustic sources. For low frequency uses it is common to let the sources have a circular surface (in the form of a piston) when the hydraulic principle is employed, and a cylindrical shape with either a circular or elliptic cross-section when piezoelectric and magnetostrictive materials are used.

A concept where a hydraulic piston source is employed, is described in The Marine Vibrator Source, First Break Vol. 6 No. 9, September 1988/285.

The greatest problem with this type of controllable source is to obtain a well defined and sufficiently high amplitude of the oscillations. In order to obtain this there will be a need for either a large source surface or a small source surface having high oscillation amplitudes.

Vibrators based on the hydraulic principle (for example within marine seismic exploration) provide high amplitudes at low frequencies. The piston motions are controlled by a valve arrangement. The degree of control of these hydraulic piston sources as regards amplitude combined with frequency, is limited, however.

Another type of acoustic source operates in the same way as electrodynamic loudspeakers with an electrically conducting coil making a controllable magnetic field, and a permanent magnet. When the coil is supplied with a varying electric current the two parts will move in relation to each other. These in their turn put a piston in motion which transfers the vibrations to the surrounding water. The piston has approximately the same diameter as the coil. Examples of such sources are found in the US Navy series J-9, J-11 and J-15, manufactured by Marine Resources in Florida, USA.

These sources are found in may different sizes. They have a relatively flat frequency respons, but low efficiency. Larger sources may have a higher efficiency, but smaller bandwidth.

Norwegian patent 176.457 describes a drive assembly for acoustic sources based on a construction comprising a cylindrical shaped elastic mantel with an elliptic cross section. The source has two beams near the ends of the major axis and the drive assembly is positioned between these end beams.

In Norwegian patent application 94.1708 (international patent application no PCT/NO95/00071) flextensional sources are described with various embodiments of the sound emitting surfaces.

The object of this invention is to provide a drive assembly capable of emitting signals within a wide range of frequencies. The drive assembly may be used in a number of different situations in addition to seismic explorations, such as uses related to submarine sound sources and sonars. The shape of the sound emitting surfaces may vary according to use, and all of the different embodiments mentioned above may be utilized.

To obtain this a drive assembly is provided which is characterized as descibed in claim 1.

The invention will be described in detail below, referring to the disclosed drawings.

Figure 1:
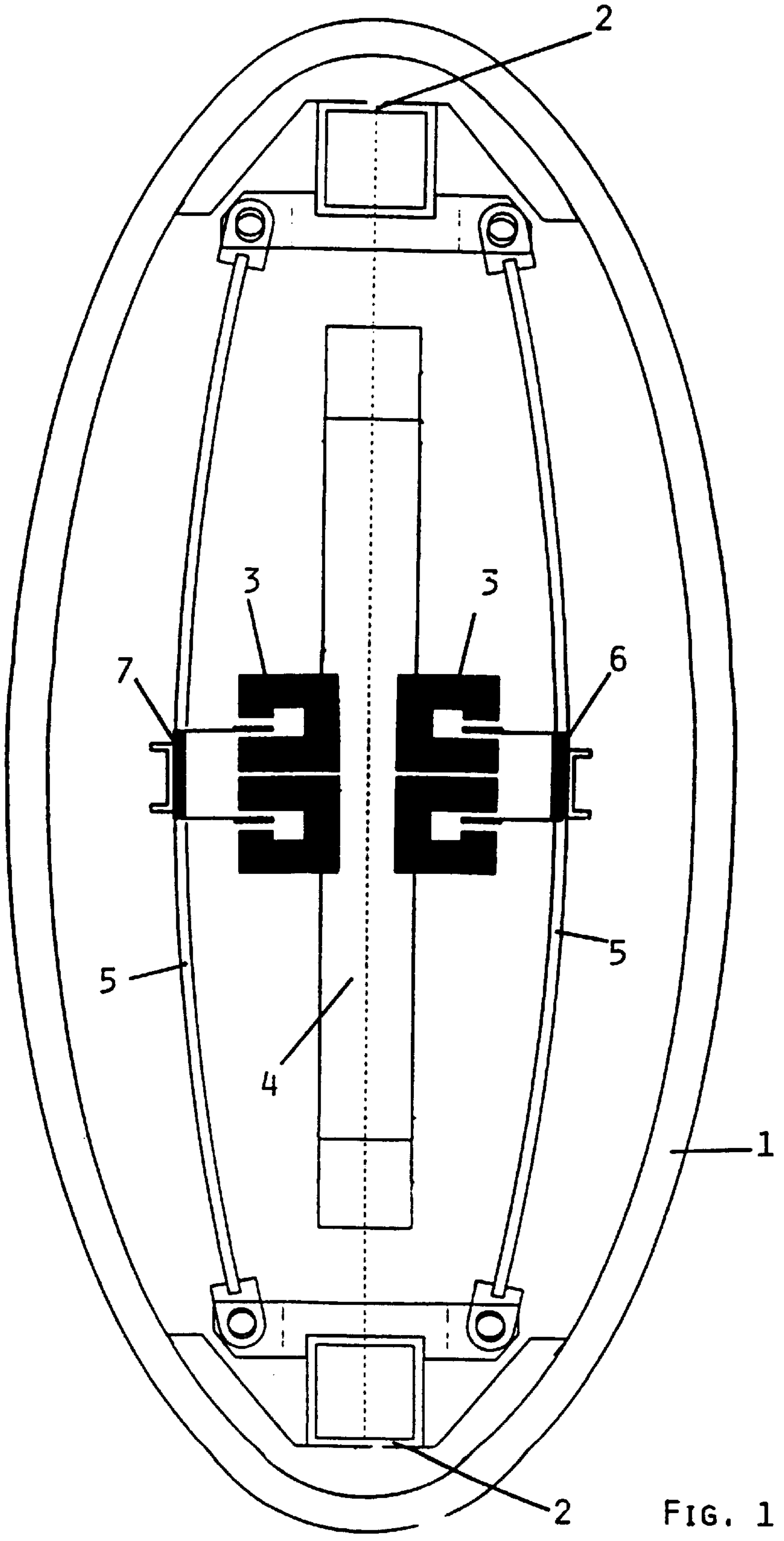
FIG. 1 shows a section of an embodiment of the invention as seen from one side.

In FIG. 1 an embodiment of the invention is shown in which the transmission elements 5 have a slightly arched shape and the electromagnetic parts 3, 6 are centrally mounted on the frame 4 and the transmission elements 5 respectively. The transmission elements may be shaped as flexible plates or rods and are preferrably rotatably fastened to the fastening devices 2. The distance from the central part of the transmission elements 5 to the axis between the fastening devices 2 is substancially less than the distance from the central part to the fastening devices 2. This way a transmission is provided in which a large movement of the drive part 6 on the transmission element 5, but with a relatively small force, leads to a small movement of the fastening devices 2, but with a correspondingly larger force. The transmission will depend on the curvature of the transmission elements 5. If the transmission elements are essentially straight a frequency doubling is obtained compared to the movements of the drive.

The fastening devices 2 are shown in the figure as beams, but the fastening of the transmission elements 5 to the sound emitting surfaces may also be done directly to the sound emitting surfaces.

The sound emitting surfaces in FIG. 1 are elliptic. When the fastening devices 2 are pulled inwards by the transmission elements the ellipse will widen, creating a pressure wave in the enviroment. This way the movements of the electromagnetic drives will propagate outwards and result in acoustic waves in the water. By varying the eccentricity of the ellipse and the transmission rate in the drive assembly it may be adapted to different situations.

In other embodiments of the sound emitting surfaces other solutions may be chosen. As an example the fastening devices may be fastened directly to pistons, in which a relatively large movement of the drives will provide a small movement of the pistons. In a this example the frame may also extend at least partially outside the transmission elements 5 so that said first drive parts is positioned outside the other drive parts 6, 7.

Figure 2:
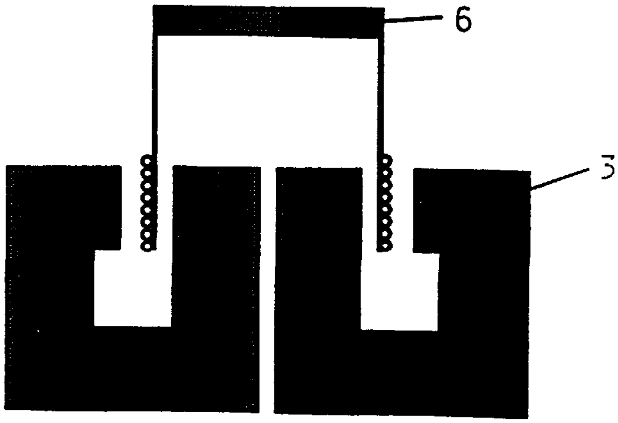
FIG. 2 shows a detail of the electromagnetic drive.

FIG. 2 shows the electromagnetic drive in FIG. 1. The drive consists of two parts in which the first drive part 3 is fastened to the frame 4 and consists of a permanent magnetic material, and the second is fastened to one of the transmission elements 5 and consists of a coil. When a current is sent through the coil a magnetic field is created. The magnetic field will interact with the field from the magnetic part and provide a relative movement of the parts. The resulting force may be expressed as:

$$F=I\cdot l\cdot B$$

where I is the current in the coil, l is the length of the conductor and B is the magnetic flux density.

Depending on the desired force either the size of the electromagnetic drive or the number of drives on each transmission element 5 may be varied. More than one transmission element along the axis of the drive assembly with one or more drives on each transmission element 5 may also be used. It is, however, advantageous if the sum of the forces on each side of the frame is symmetric relating to the frame axis to minimize the strain on the construction. In the contruction shown in FIG. 1 it is also an advantage if the sum of the forces results in a vector being perpendicular to the main axis of the elliptic sound emitting surfaces 1.

Figure 4:
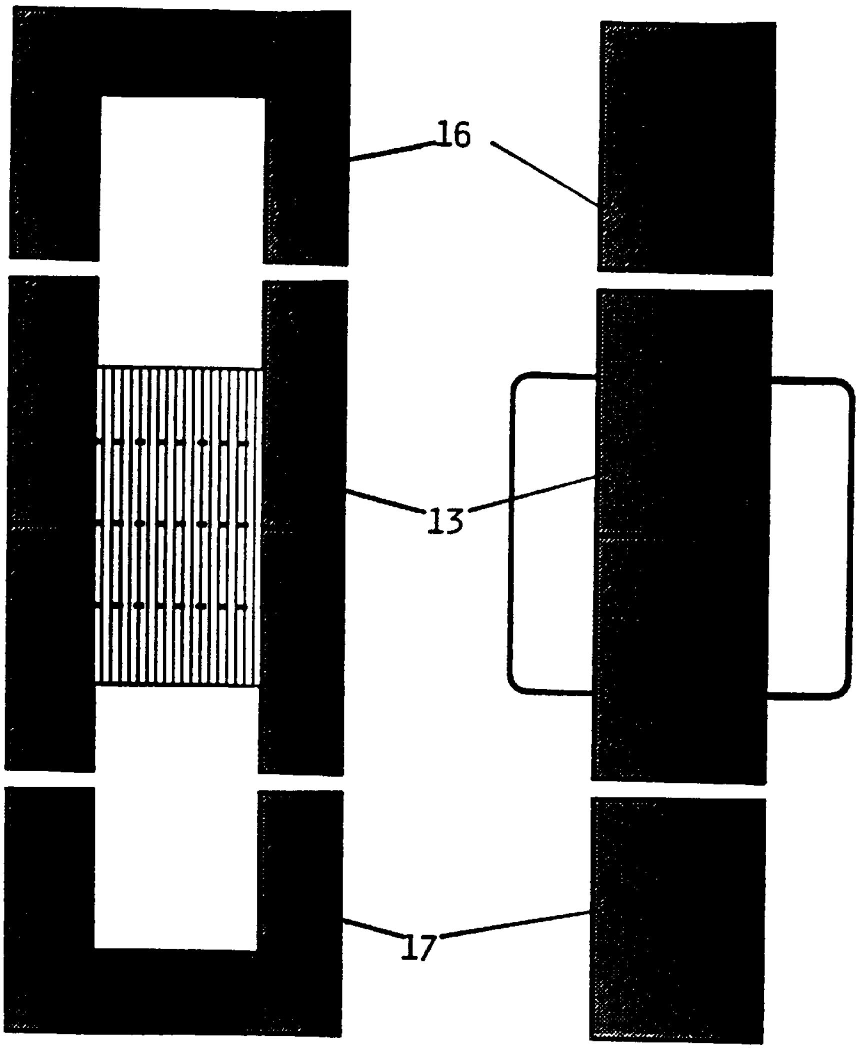
FIG. 4 shows the electromagnetic drive of FIG. 3.
Figure 3:
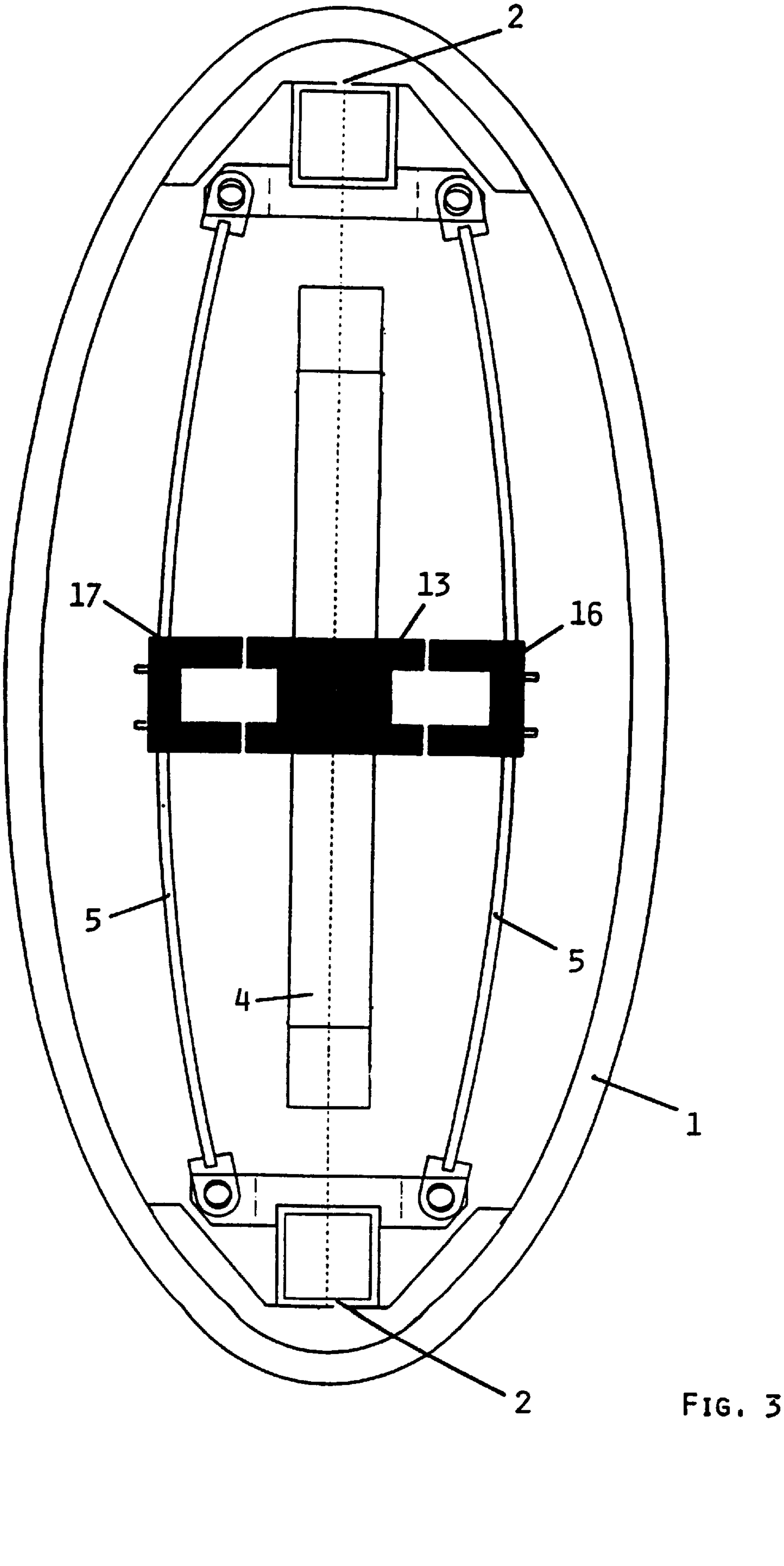
FIG. 3 shows a section corresponding to the one shown in FIG. 1 with a different embodiment of the electromagnetic drive.

FIG. 3 shows a corresponding acoustic source as FIG. 1 with another electromagnetic drive. The drive is shown in detail in FIG. 4. In this case the drive consists of a first drive part 13 and two second drive parts 16, 17, and the coil is positioned in the first drive part 13 in the frame and the second drive parts 16, 17 are the passive magnetic elements. This way it is easier to obtain a symmetric movement of the two second drive parts. The coil 13 encloses a core of magnetic material, e.g. iron, guiding the magnetic field out towards the second magnetic drive parts 16, 17, e.g. also made of iron, and thus affecting these with a force F that may be expressed as:

$$F=\frac{N^2 I^2}{r_{tot}^2 \mu_{gap} \mu_0 A}$$

where N is the number of windings, I is the current, $r_{tot}$ is the reluctance, $\mu_{gap}$ is permeability number, $\mu_0$ is the permeability in vacuum and A is the area.

Figure 5:
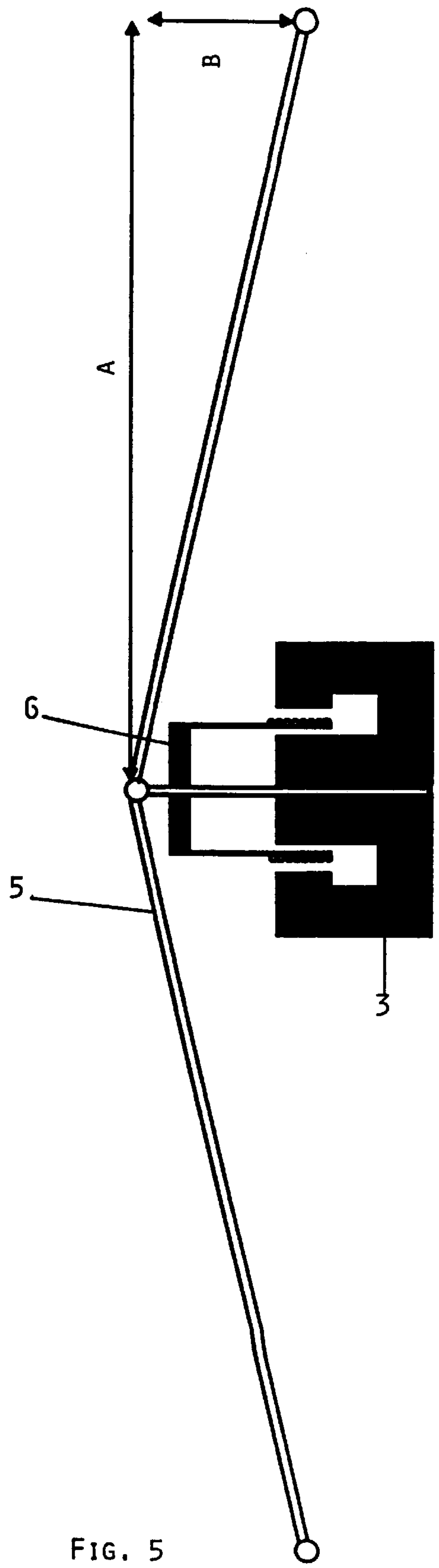
FIG. 5 shows an alternative embodiment of the transmission elements.

FIG. 5 shows an alternative embodiment of the transmission elements consisting of relatively rigid rods, each rotatably fastened at one end to the the second drive parts 6 and in the other end to the fastening devices 6. When moving the drive parts 6 outwards the other ends of the rods will be pulled inwards with a transmission rate as described above. The ratio between these movements wil in this case be equal to b/a.

FIG. 5 shows also another embodiment of the drive part in FIG. 2, in that it also comprises a control rod positioned centrally through the coil 6 and the magnet 3 in order to secure a smooth movement.

Figure 6:
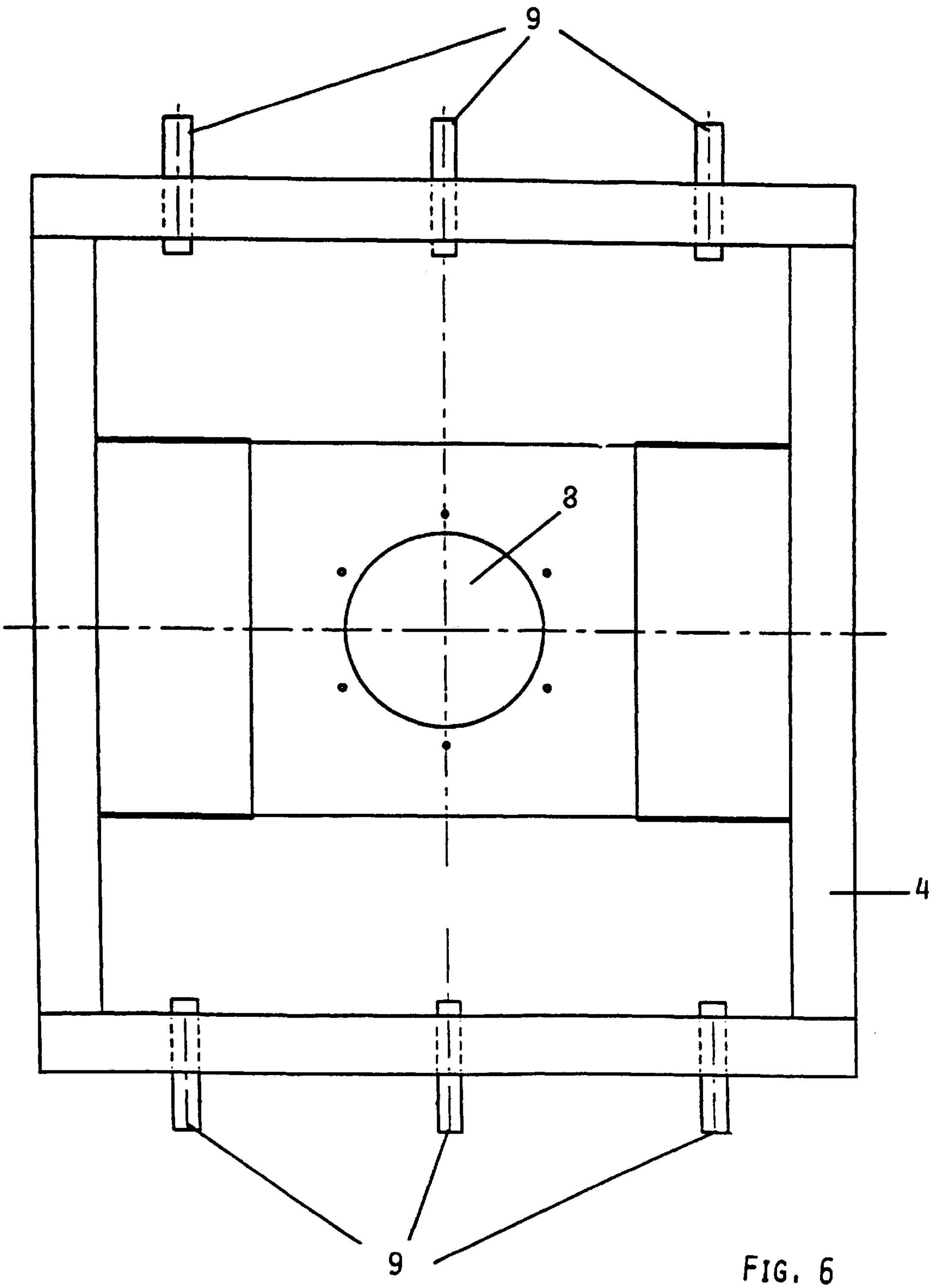
FIG. 6 shows the frame 4 of FIGS. 1 and 3 as seen from the front.

FIG. 6 shows the frame 4 as seen from above with a number of centrally positioned holes 8 for the mounting of the first drive part 3, 13, and bolts 9 for fastening corresponding fastening devices to the acoustic source (not shown). When using more than one electromagnetic drive the frame may be equipped with more holes for the fastening of these.

We claim:

1. Drive assembly for acoustic sources with vibrating, sound emitting surfaces capable of being set in vibrational motion, comprising a frame comprising at least one centrally positioned first drive part, characterized in that it also comprises:

two or more fastening devices mounted in relation to the sound emitting surfaces and positioned on opposite sides of the frame, two or more flexible transmission elements connecting the fastening devices to each other and extending on both sides of the axis between the two fastening devices, two or more second drive parts connected to the transmission elements and positioned in cooperation with said first drive parts in order to make electromagnetic drives, and that each of the electromagnetic drives are adapted to provide a controlled oscillating relative motion between the related first drive parts and second drive parts.

2. Drive assembly according to claim 1, characterized in that at least one of the transmission elements consists of flexible plates.

3. Drive assembly according to claim 1, characterized in that at least one of the transmission elements consists of flexible rods.

4. Drive assembly according to one of claims 1, 2, or 3, characterized in that the transmission elements have a curved shape.

5. Drive assembly according to one of claims 1, 2, or 3, characterized in that one or more electromagnetic drives are mounted in relation to each transmission element.

6. Drive assembly according to one of claims 1, 2, or 3, characterized in that at least one of the transmission elements consists of rods each being rotatably fastened in one end to said second drive part, and in the other end to said fastening devices.

7. Drive assembly according to one of claims 1, 2, or 3, characterized in that each electromagnetic drive consists of an electric coil and one or two parts of a magnetic material.

8. Drive assembly according to one of claims 1, 2, or 3, characterized in that the first drive parts positioned on the frame are positioned closer to the axis between the fastening devices than said second drive parts.

9. Drive assembly according to one of claims 1, 2, or 3, characterized in that the electromagnetic drives are symmetrically positioned in relation to the axis between the fastening devices.

10. Drive assembly according to claim 9, characterized in that said first drive parts and second drive parts are mounted on the frame and the transmission elements, respectively, with equal distance from the two fastening devices, and that the relative oscillating motion between the first drive parts and the second drive parts have a direction essentially perpendicular to the axis between the fastening devices.

11. Drive assembly according to one of claims 1, 2, or 3, characterized in that the distance between the fastening devices is considerably larger than the doubled distance between connection points of said second drive parts on the transmission elements and the axis between the fastening devices.

12. Drive assembly for generating sound waves in a fluid, which comprises:

at least one energizable first drive part, second drive parts positioned in cooperation with each first drive part so as to produce oscillating relative movement between the first and second drive parts when each first drive part is energized, and at least one sound emitting surface vibrated by one of the first and second drive parts so as to generate sound waves in the fluid.

13. The drive assembly of claim 12, further including a control rod positioned centrally through the first and second drive parts for controlled oscillating movement therebetween.

14. The drive assembly of claim 12, further including at least one transmission element engaging the sound emitting surface with one of the first and second drive parts for converting the oscillating relative movement between the first and second drive parts into vibrational motion of the sound emitting surface.

15. The drive assembly of claim 14, wherein the transmission elements comprise curved flexible plates.

16. The drive assembly of claim 14, wherein the transmission elements comprise curved flexible rods.

17. The drive assembly of claim 14, wherein each transmission element is rotatably connected to one of the first and second drive parts whereby reciprocation of the transmission element produces relative rotation between the transmission element and the drive part to which it is rotatably connected.

18. The drive assembly of claim 14, further including at least one fastening device engaging the sound emitting surface with the transmission element for vibrating the sound emitting surface.

19. The drive assembly of claim 18, wherein the sound emitting surfaces are engaged by a pair of spaced apart fastening devices, and wherein the oscillating relative movement between the first and second drive parts has a direction essentially perpendicular to the axis between the spaced apart fastening devices.

20. The drive assembly of claim 19, wherein the first and second drive parts are symmetrically positioned in relation to the axis between the fastening devices.

21. The drive assembly of claim 18, wherein each transmission element has at least one end rotatably connected to a fastening device.

22. The drive assembly of claim 12, further including a frame for supporting one of the first and second drive parts.

23. The drive assembly of claim 12, wherein:

each first drive part comprises an electric coil for producing a varying first magnetic field when energized by a varying electric current, and each second drive part comprises a magnetic material having an associated magnetic field.

* * * * *